(12) United States Patent
Duffett-Smith et al.

(10) Patent No.: US 7,593,736 B1
(45) Date of Patent: *Sep. 22, 2009

(54) POSITIONING SYSTEM FOR DIGITAL TELEPHONE NETWORKS

(75) Inventors: Peter James Duffett-Smith, Cambridge (GB); Paul Hansen, Cambridgeshire (GB)

(73) Assignee: Cambridge Positioning Systems Ltd., Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/529,914

(22) PCT Filed: Oct. 21, 1998

(86) PCT No.: PCT/GB98/03149

§ 371 (c)(1),
(2), (4) Date: Apr. 21, 2000

(87) PCT Pub. No.: WO99/21028

PCT Pub. Date: Apr. 29, 1999

(30) Foreign Application Priority Data

Oct. 22, 1997 (GB) .................................. 9722324.2

(51) Int. Cl.
*H04W 24/00* (2006.01)
(52) U.S. Cl. ............... 455/456.1; 455/456.2; 455/456.5; 455/456.6; 455/457; 342/450; 342/453
(58) Field of Classification Search ............... 455/456.1, 455/456.2, 456.5, 456.6, 457; 342/450, 451, 342/453
See application file for complete search history.

(56) References Cited

U.S. PATENT DOCUMENTS 4,142,069 A * 2/1979 Stover ........................ 370/607

(Continued)

FOREIGN PATENT DOCUMENTS

DE 19621225 12/1996

(Continued)

OTHER PUBLICATIONS

P.J. Duffet-Smith and G. Woan, "The Cursor Radio Navigation and Tracking System", Journal of Navigation, vol. 45, No. 2, pp. 157-165 (1992).

*Primary Examiner*—Sharad Rampuria
*Assistant Examiner*—Huy D Nguyen
(74) *Attorney, Agent, or Firm*—Roylance, Abrams, Berdo & Goodman, L.L.P

(57) ABSTRACT

The invention relates to a determining the position of a mobile receiver 4 in a digital telephone network positioning system. A first receiver 3 is at a known location and others are mobile. The method involves transmitting signals from a plurality of sources 1, the transmission signals having a format at least a portion of which has predetermined values or a portion of which is repeated. The time offset of the transmission signals received at each receiver 4,5 from a transmission source 1 relative to a reference clock of each receiver is determined by generating a reference signal locked to the reference clock. The reference signal has a similar format to the transmission signals and includes a portion identical to the predetermined values or repeated portion of the received signal and compares the received transmission signal and the reference signal. The time delay between the respective signals received at the receivers 4,5 is determined from their relative time offset, to thereby determine the position of the other receivers 4.

100 Claims, 10 Drawing Sheets

U.S. PATENT DOCUMENTS

| Patent | Date | Inventor | Class |
|---|---|---|---|
| 5,045,861 A | 9/1991 | Duffett-Smith | 342/457 |
| 5,208,756 A | 5/1993 | Song | 364/449 |
| 5,293,642 A | 3/1994 | Lo | 455/33.1 |
| 5,293,645 A | 3/1994 | Sood | 455/54.1 |
| 5,327,144 A | 7/1994 | Stilp et al. | 342/387 |
| 5,365,450 A | 11/1994 | Schuchman et al. | 364/449 |
| 5,422,813 A | 6/1995 | Schuchman et al. | 364/449 |
| 5,512,909 A | 4/1996 | Kronhamn | 342/417 |
| 5,519,618 A | 5/1996 | Kastner et al. | 364/439 |
| 5,568,153 A | 10/1996 | Beliveau | 342/357 |
| 5,600,706 A | 2/1997 | Dunn | 379/59 |
| 5,604,765 A | 2/1997 | Bruno et al. | 375/200 |
| 5,612,729 A | 3/1997 | Ellis et al. | 348/2 |
| 5,701,328 A | 12/1997 | Schuchman et al. | 375/204 |
| 5,729,694 A | 3/1998 | Holzrichter et al. | 395/2.17 |
| 5,838,279 A | 11/1998 | Duffett-Smith et al. | 342/459 |
| 5,938,721 A * | 8/1999 | Dussell et al. | 701/211 |
| 5,960,355 A | 9/1999 | Ekman et al. | 455/456 |
| 6,002,361 A * | 12/1999 | Schipper | 342/357.08 |
| 6,009,085 A * | 12/1999 | Lechner | 370/324 |
| 2004/0005899 A1 * | 1/2004 | Nir et al. | 455/456.1 |

FOREIGN PATENT DOCUMENTS

| | | |
|---|---|---|
| EP | 0303371 | 2/1989 |
| EP | 0767594 | 9/1996 |
| GB | 2254508 | 10/1992 |
| GB | 2260050 | 3/1993 |
| GB | 2284054 | 12/1997 |
| WO | 9523981 | 9/1995 |
| WO | 9730360 | 2/1997 |
| WO | 9744681 | 5/1997 |
| WO | 9744682 | 5/1997 |
| WO | 9711384 | 7/1997 |
| WO | 9723785 | 7/1997 |
| WO | 9728455 | 8/1997 |
| WO | 9728456 | 8/1997 |
| WO | 9813947 | 9/1997 |
| WO | 9818018 | 4/1998 |
| WO | 9819488 | 5/1998 |

* cited by examiner

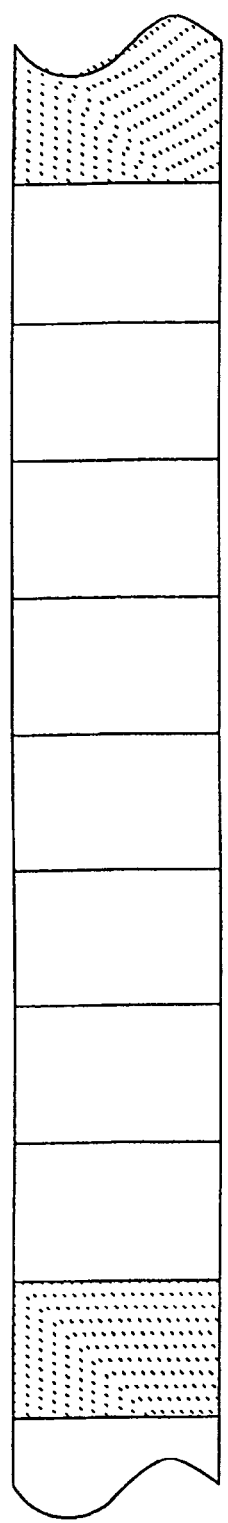 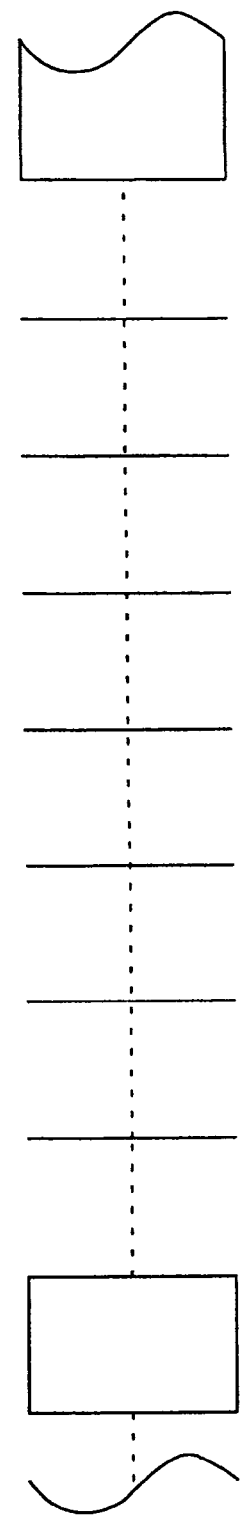
(a) (b)
Figure 3

Auto-correlation function for expected extended training sequence

Auto-correlation function for measured extended training sequence

Estimated cross-correlation function

Measured cross-correlation function

POSITIONING SYSTEM FOR DIGITAL TELEPHONE NETWORKS

The present invention relates to a positioning system for use with digital telephone networks such as a GSM network.

EP-A-0 303 371, the contents of which are hereby incorporated by reference, describes a radio navigation and tracking system which makes use of independent radio transmitters set up for other purposes. The signals from each transmitter, taken individually, are received by two receiving stations, one at a fixed and known location, and the other mounted on the mobile object whose position is to be determined. A representation of the signals received at one receiving station is sent via a link to a processor at the other receiving station, where the received signals are compared to find their phase differences or time delays. Three such measurements, made on three widely spaced independent transmitters, are sufficient to determine the position of the mobile receiver in two dimensions, i.e. its position on the ground. The phase or time offset between the master oscillators in the two receivers is also determined.

WO-A-94-28432 shows how this same system may be applied to radio positioning inside tunnels, underground car parks, or other shielded spaces.

In yet another patent specification, WO-A-97-11384, the contents of which are hereby incorporated by reference, these ideas are extended further and applied specifically to GSM and other digital telephone networks, for example CDMA, UMTS, or satellite-based systems (the latter providing the possibility of measuring height as well as position on the ground). The system, known as CURSOR, uses the signals from the network transmitters for positioning purposes (see FIG. 1). A short burst of the signals from one such transmitter (known as a Base Transceiver Station, BTS) are received by a mobile handset (known as the CURSOR Rover Unit, CRU) whose position is to be determined, where they are converted to baseband, digitised, and recorded in memory. The same burst is also received by another receiver (CURSOR Base Unit, CBU) at a fixed and known location, converted likewise to baseband, digitised and recorded. This process is carried out in the same quick sequence on the signals from at least three widely spaced BTSs at both receivers, after which the recordings are transferred to a central processor (the CURSOR position processor, CPP) via links L1 and L2. Here the corresponding sets are compared, for example using a cross-correlation procedure, to find the time delays between them. The three sets of recordings produce three time delays, from which the position of the CRU can be found relative to the (known) positions of the BTSs and the known position of the CBU.

In a practical application of the above system to a digital telephone network such as GSM, the signals on the Broadcast Control Channel, BCCH, are used for positioning. This is because they are guaranteed always to be present whatever the level of other traffic on the network.

In the system as described in WO-A-97-11384, a substantial quantity of data must be transferred from each receiver to the CPP for every position calculation. The transfer from the CRU is usually achieved using the network itself, for example by using a data-transfer feature. In a typical GSM application, it might be necessary to record 256 bytes for each of the three BTSs monitored, giving rise to about 800 bytes of data to be transferred. This could be done by setting up a data-transfer call, by using data over a voice call, or by using several short message service (SMS) packets concatenated together. However, each of these solutions has commercial disadvantages. For example, a user calling an emergency operator may not be able to wait while a data call is first established, data transferred, and then cleared down, before being able to speak to the operator.

The present invention is intended to overcome this disadvantage by making the recordings in a different fashion, and by exploiting the special characteristics of digital telephone signals. The quantity of data needing to be transferred may be reduced dramatically, making it fit easily, for example, into one SMS packet. Furthermore, the measurements by the CRU can be made entirely during the handset's idle time, so that there is no delay when the user wishes to make a call, and giving a better position solution based on a longer averaging of the received signals.

The principles of operation of the present invention may best be understood by first considering the equations governing the CURSOR system, as explained in WO-A-97-11384. In FIG. 2 we show the geometry of a two-dimensional CURSOR system. The origin of Cartesian co-ordinates x and y is centred on the CBU positioned at O. The orientation of the axes is immaterial, but may conveniently be set so that the y axis lies along the north-south local map grid. The mobile unit (CRU), R, is at vector position r with respect to the CBU position O. A BTS, A, is shown at vector position a.

Consider first the signals from BTS A. The time difference, $\Delta t_a$, measured between the signals received at O and R is given by $$\Delta t_a = (|r-a| - |a|)/v + \epsilon$$

where v is the speed of the radio waves, and $\epsilon$ is the clock time offset between the clocks in the receivers at O and R. Similarly, we may write for two other BTSs (say B & C) at vector positions b and c (not shown in FIG. 2):

$$\Delta t_b = (|r-b| - |b|)/v + \epsilon$$

and $$\Delta t_c = (|r-c| - |c|)/v + \epsilon. \tag{1}$$

$\Delta t_a$, $\Delta t_b$, $\Delta t_c$, are measured by the methods disclosed in WO-A-97-11384 and the values of a, b, c, and v are known, and hence the equations can be solved to find the position of the handset, r.

Consider now the relationship between the signals from any two BTSs, say A and B, received by the CRU. First, the assumption is made that the CRU can receive on two channels simultaneously, one channel tuned to the BCCH from A and the other tuned to the BCCH from B. If A and B were truly independent incoherent transmitters, there would be no stable relationship between their signals, and a cross correlation performed at the handset would reveal no significant peak. In a GSM or other digital telephone network, however, the signals from BTSs A and B do have significant coherence. For example, they each have a common framing structure, are locked to high quality reference oscillators, and carry significant amounts of common data. A peak can therefore be found in the cross-correlation between them. If the network were synchronised, that is if the framing structures were locked together, the time offset of the peak would be the difference in distances from A and B to the CRU divided by v. In practice, there is also an unknown and slowly-varying time offset, $\epsilon_{ab}$, sometimes known as the transmission time offset, or relative transmission offset, or relative transmission delay. Hence, we may write $$\Delta t_{ab1} = (|r-a| - |r-b|)/v + \epsilon_{ab}$$

where $\Delta t_{ab1}$ is the time offset of the received signals from BTSs A & B as determined from the cross-correlation. We may also perform the same analysis on the signals received simultaneously from BTSs B and C, giving $$\Delta t_{bc1} = (|r-b|-|r-c|)/v + \epsilon_{bc}. \quad (2)$$

The same pairs of signals can also be received by the CBU, giving corresponding time offsets $\Delta t_{ab2}$ and $\Delta t_{bc2}$ as follows:

$$\Delta t_{ab2} = (|a|-|b|)/v + \epsilon_{ab}$$

and $$\Delta_{tbc2} = (|b|-|c|)/v + \epsilon_{bc}. \quad (3)$$

Subtracting equations 3 from equations 2 gives us $$\Delta t_{ab1} - \Delta t_{ab2} = (|r-a|-|a|-|r-b|+|b|)/v$$

and $$\Delta t_{bc1} - \Delta t_{bc2} = (|r-b|-|b|-|r-c|+|c|)/v. \quad (4)$$

The values of $\Delta t_{ab1}$ and $\Delta t_{bc1}$ have been measured at the CRU as described above, and the values of $\Delta t_{ab2}$ and $\Delta t_{bc2}$ have been measured at the CBU. The values of a, b, c, and v are known and hence the position, r, of the CRU can be deduced using standard mathematical methods.

Note that $\epsilon$, $\epsilon_{ab}$, and $\epsilon_{bc}$ have all disappeared from equations (4). This is because we have made the assumption that the measurements by the CRU and CBU are either performed simultaneously, or sufficiently close together that there is no significant drift between them. In practice, we can use the characteristics of the BTS signals to synchronise the recordings at the two receivers. For example, in a GSM system, the signals radiated by the BTSs are complex. The data is programmed into so-called time division multiple access (TDMA) frames lasting 4.615 ms, further subdivided into 8 time slots. Each time slot carries 156.25 bits at a rate of about 271 kbits s$^{-1}$ and may, for example, represent a 'normal burst' of data and training bits, a 'frequency correction burst' (FCB) of fixed pattern, a 'synchronisation burst' (SCH) of data and training bits, or an 'access burst' with a synchronisation sequence and data. Each of these bursts also carries header, tail, and guard bits. How many of the time slots are being used at any moment in a given frame depends on the way the system has been set up and on the amount of traffic at that moment. However, even in quiet conditions the BCCH logical channel will be broadcasting one access burst in every frame. Furthermore, these frames are numbered with a repeat period of several hours. We can therefore use the arrival of a given frame number to synchronise the start of the recordings made by the CRU and CBU.

We can also assume that the time offsets between the oscillators controlling the BTS transmissions, and the time offsets between the oscillators in the two receivers, vary slowly with time, and can thus be modelled by a linear fit or low-order polynomial over short periods. Most crystal oscillators exhibit stabilities of one part in $10^6$ or better over short periods. The positional error introduced by each millisecond of mis-synchronisation is therefore likely to be no more than one metre, e.g. no more than $10^{-6} \times 10^{-3} \times v = 0.3$ m for v is $3 \times 10^8$ m s$^{-1}$.

According to the present invention therefore, there are provided at least two receivers of a digital telephone network position determining system, a first of which is at a known location and a second of which is located on a mobile unit whose position is to be determined, which system utilises transmission signals having a format at least a portion of which has predetermined values, in which the relative time offsets of the transmission signals received at each receiver from a number of transmission sources are measured relative to each other by comparing, for example by cross-correlating, the received transmission signals from the different transmission sources with one another to determine their relative time offsets and thereby determine the position of the second receiver by determining the time delay between the respective signals received at both receiving stations. The invention includes both the system and a position determining method.

Throughout the foregoing discussion, it has been assumed that both the CRU and CBU can receive two channels simultaneously. Whilst this might be made the case for CBUs, it is rarely so for mobile handsets. It might seem, therefore, that the present invention has little application in a real system. However, the special characteristics of the digital telephone system once again come to our aid. It is found that features of the signals are repetitive, and that a significant degree of correlation exists between signals from the same BTS when displaced by a whole number of frame periods. For example, in the case of a BCCH in quiet conditions, we have noted above that there is an access burst transmitted in every frame. It is also common practice to transmit a frequency correction burst and a synchronisation burst at 10 or 11 frame intervals. We have already noted the correlation which exists between signals from different BTSs at the same time. We now find correlation between the signals from different BTSs at different times. For example, we can find a significant cross-correlation between the BCCH signals from BTS A and from BTS B, the latter being recorded, say, exactly 1 frame period after those from A. This gives plenty of time for the single channel receiver in the handset to retune to channel B after recording the signals from A. However, we now need to be able to measure a longer time offset between the two recordings precisely, the time offset having been increased by the repeat period of the transmitted signals. This can be done using the crystal oscillator in the handset, and again introduces an error of less than a meter for each millisecond of total offset.

Thus, according to another aspect of the present invention, there are provided at least two receivers of a position determining system, a first of which is at a known location and a second of which is located on a mobile unit whose position is to be determined, which system utilises transmission signals having a format at least a portion of which is sequentially repeated, in which the relative time offsets of the transmission signals received at each receiver from a number of transmission sources are measured relative to each other by comparing, for example by cross-correlating, the received transmission signals from the different transmission sources with one another to determine their relative time offsets and thereby determine the position of the second receiver by determining the time delay between the respective signals received at both receiving stations.

The foregoing discussion shows how the partial coherence of the signals from neighbouring BTSs on different physical channels can be used to measure time offsets. The present invention extends these ideas.

According to a further aspect of the present invention, there is provided a positioning system comprising at least two receivers of a digital telephone network having a plurality of transmission sources, a first of which receivers is at a known location and a second of which is a mobile receiver whose position is to be determined, said system utilising transmission signals having a format at least a portion of which has predetermined values or a portion which is repeated, each receiver including
  a reference clock;
  means for generating in each receiver a reference signal locked to the reference clock, the reference signal having a similar format to the transmission signals and thus a portion identical to the portion of the received signal which has predetermined values or which is repeated; and means, in each receiver, for comparing, for example by cross-correlating, the received transmission signal and the reference signal to determine their relative time offset to enable thereby the position of the second receiver to be determined by determining the time delay between the respective signals received at both receivers.

In a digital telephone network, for example a GSM system, the transmission sources are preferably the base transceiver stations and the mobile receiver may be a digital handset.

The reference signals provide, in effect, templates which can be matched with the transmission signals. Using the fact that the signals are formatted in the same way and thus have identical portions allows them to be matched (e.g. cross-correlated), and the amount in time by which a recording of one has to be moved relative to the other in order to match, provides an estimate of the time offset.

Knowing the time offsets enables the relative received time offsets between the different transmission source signals to be calculated, and hence the position of the mobile to be determined as described in more detail below.

The time offsets can be measured using locally-created templates in a GSM telephone system, for example in the following manner. Suppose, for example, that the CRU has recorded a short burst of the signals from BTS A. Contained within that recording is the framing structure and other 'given' data (or predetermined values) described above which is a constant feature of those transmissions. The processor within the CRU can create a matching template, based on the known structure of the network signals, and can ignore those parts where the exact form of the received data is not known. Such a template is shown by way of example in FIG. 3. The shaded portions of the transmitted signals, shown at (a), are exactly specified by the network protocol (the frame structure etc.). These can be matched by the locally-generated template, shown at (b). The unshaded portions of (a) cannot be predicted in advance, and so these parts are not used in the correlation. In the correlation process between the received signals, (a), and the locally-generated template, (b), only the shaded portions systematically contribute to a correlation peak, and the unshaded portion can be ignored. When the template is matched to the recording, the correlation peak corresponds to the time offset, i.e. the time offset between the received signals and the local clock inside the CRU. This time offset, $\Delta t_{a1}$ is given by $$\Delta t_{a1}=(|r-a|)/v+\epsilon_a+\epsilon_1$$

where $\epsilon_a$ is the time offset of the BTS transmissions and $\epsilon_1$ is the time offset of the CRU's internal clock, both relative to a mythical universal 'absolute' clock. The signals from B and C may also be measured in the same way, giving $$\Delta t_{b1}=(|r-b|)/v+\epsilon_b+\epsilon_1$$

and $$\Delta t_{c1}=(|r-c|)/v+\epsilon_c+\epsilon_1. \quad (5)$$

The same measurements can also be made at the CBU, giving $$\Delta t_{a2}=(|a|)/v+\epsilon_a+\epsilon_2,$$

$$\Delta t_{b2}=(|b|)/v+\epsilon_b+\epsilon_2,$$

and $$\Delta t_{c2}=(|c|)/v+\epsilon_c+\epsilon_2. \quad (6)$$

Subtracting equations 6 from 5 gives us $$\Delta t_{a1}-\Delta t_{a2}=(|r-a|-|a|)/v+\epsilon$$

$$\Delta t_{b1}-\Delta t_{b2}=(|r-b|-|b|)/v+\epsilon$$

and $$\Delta t_{c1}-\Delta t_{c2}=(|r-c|-|c|)/v+\epsilon \quad (7)$$

where $\epsilon=\epsilon_1-\epsilon_2$. It will be noted that equations 7 are just like equations 1, and hence can be solved in the same way to find the position of the CRU, r. Thus, there is devised a CURSOR system which operates in exactly the same way as that described in WO-A-97-11384, with the same characteristics of accuracy, speed etc. The differences lie in the manner in which the measurements are made and in the content of the data sent over the links to the CPP. In a CURSOR system as described in WO-A-97-11384, the time offsets are determined by the CPP from the raw data recorded by both CRU and CBU. According to the invention of the present application, the time offsets are determined locally, requiring much less data to be sent. Note, too, that in this system the relative transmission delays of the signals transmitted from the different BTSs are not measured and are never used in the computation. The geometry of the calculation is based on the intersection of circles centred on the positions of the BTSs. This is very different from other systems in which the equivalent of the CBU measures the relative transmission delays and transmits them to the processing unit which then performs a standard calculation based on the intersection of hyperbolae.

The above description shows how the use of a single locally-generated template can be used to estimate the time offsets. The template can be generated from the known characteristics of the network signals, as described above, or it can be measured using the signals, say, from the first received channel as the template for correlating with the other channels. It may sometimes be advantageous to use more than one template in the estimation process, especially when the received signals are distorted, for example by the effects of multipath propagation. The best template from the point of view of maximising the correlation is one which matches exactly the received signals. However, the estimate of the time offset so obtained may contain a systematic bias which can be shown up by using different templates. This is illustrated in FIG. 4 where the transmitted profile is shown at (a), and the received profile (somewhat idealised) is shown at (b). A range of templates corresponding to different amounts of multipath, shown at (c1), (c2) etc., can be matched to the received data, and the one giving the closest match provides an estimate of the multipath delay.

A GSM CURSOR positioning system, then, according to the teachings of the present invention, has a fixed CBU constantly cycling through the BCCHs from the surrounding BTSs and measuring the time offsets between them and the template locked to the internal clock. Its local processor maintains a low-order polynomial fit to the time offsets, so that a value could be obtained for any particular moment (such as the arrival of a given frame number) by interpolation. The polynomial coefficients, or the interpolated time offsets, are all that need to be sent to the CPP on request. A CURSOR-enabled handset within the cell also maintains a similar set of polynomial fits. This can be done by cycling around all the BCCHs in range during its idle time, i.e. when no call is in progress and the processor is not doing very much. As soon as a position measurement is required, the polynomial coefficients, the interpolated time offsets, or the points around the peak of the cross-correlation are sent by an SMS packet to the CPP, together with a definition of the instant of measurement described, for example, by the arrival of a particular frame number on a given channel. Such a message is shown in FIG. 5. A four-byte representation of the number in ms gives a range of ±128 ms with a resolution equivalent to about 2 cm of positional error. The capacity of the SMS packet therefore allows many more than the minimum 3 BTSs to be used for each position determination, thus increasing the robustness and reliability of the measurement.

The present invention can also deliver a second benefit to the telephone network operator besides the CURSOR positioning described above. Although, as noted above, the CBUs need not measure the relative transmission delays of the BTSs network in order to determine the position of the CRU, they could nevertheless be made to do so. This information could be sent back to regional controllers to be used to 'synchronise' the network of BTSs.

The invention therefore also includes a system of synchronising a GSM or similar digital telephone network by using the time offsets measured by the fixed receivers at known locations in accordance with any of the methods defined above in accordance with the invention; and utilising the time offsets so determined to synchronise the network.

It is not usually necessary to make physical changes to reduce the offsets to zero, but sufficient merely to maintain a map of the offsets, allowing the network operating system to make allowances for them in its procedures. Benefits of having a 'synchronised' network include faster and more-reliable hand-overs between neighbouring cells as calls in progress migrate between them.

In a regional or national implementation of a system according to the present invention, there will be a network of CBUs deployed within the area of the GSM or other mobile digital telephone system. An adjacent pair of such CBUs may be able to receive the transmission signals from one or more common BTSs, as shown in FIG. 6. At a pre-determined time, such as the arrival of a particular frame number from one of the BTSs, both CBUs make a measurement of the time offset of the arrival of the signals relative to their internal clocks, as described above. Since the positions of the CBUs and the BTSs are all known, the first of equations 7 may be used to calculate the value of $\epsilon$, which now represents the time offset between the internal clocks of the two CBUs. By making similar measurements between all adjacent pairs of CBUs in the network, it is thus possible to establish a map of the relative time offsets of their internal clocks, and hence synchronise the network of CBUs.

Synchronising the network of CBUs in this fashion brings several benefits including the following. First, the positions of newly-established BTSs within the network can now be measured relative to the known positions of the CBUs by using pairs of CBUs in which one can be regarded, in effect, as the CRU but fixed at a known location. For example, in the first of equations 7, all of the variables except a are known, so that two measurements on the signals from a new BTS are sufficient to establish its position. This provides independence for the CURSOR operator from the BTS network operator. Second, errors in the positions of individual BTSs, or in the synchronisation of adjacent CBUs, may be detected by repeating the measurements described in the previous paragraph over all possible combinations of adjacent pairs of CBUs and common BTSs. Third, the synchronised network of CBUs provides an alternative means of establishing a map of the transmission time offsets of the BTSs, but this time with respect to a common 'CBU-system time' rather than just with respect to each other. One of the CBUs in the network could be provided with a high-quality atomic clock, such as a hydrogen maser or caesium beam device, and used as the time standard for the entire network.

The network of CBUs, synchronised or not, can also be made to carry out periodic scanning of the entire allocated frequency band for the appearance of new BTS units, and also changes in the frequency channels used by pre-existing units. It is therefore possible for a CURSOR operator, once he has established his regional network of CBUs, to carry on his business with a large degree of independence from the BTS network operator.

EP-A-0 303 371 describes how the position of a mobile receiver can be tracked using measurements of the phase, with the corresponding advantage of much greater precision than can be achieved using the time-measuring techniques described here. It may sometimes be an advantage to measure both the phase and the time in a practical implementation of the present invention. The in-phase and quadrature portions of the received signal can be obtained during the measurement of the time offset. These can be used to estimate the phase of the received signal. As mentioned above, the phase measurements are much more precise than are the time offset measurements. It may therefore be advantageous to combine the phase and time offset measurements in the calculation of the CRU's position, or change in position.

By way of example, consider a GSM digital telephone network. At the start of the position calculation process the time and phase differences are calculated as outlined in WO-A-97-11384 and herein above. The measurements are then repeated. The second phase measurement consists of the first phase measurement plus the change in the phase between the first and second measurements. The phase and time differences can be seen as different estimates of the same unknown quantities. Thus, when both phase and time difference measurements are made at two different epochs, the changes in these measurements reflect the movement of the mobile unit. As the phase and time difference measure the same unknown, the difference between the two sets of phase measurements should be the same as the difference between the two sets of time difference measurements when scaled appropriately. Any discrepancies between these two is caused mainly by the effects of multipath and measurement noise. In general, it is possible to obtain measurements with a precision of 1 percent of the 'wavelength' of the signal that is being measured. This is equivalent to a sub centimeter precision for the phase observations compared to a precision of approximately 10 meters for the time difference observations. Both are subjected to multipath and measurement noise, but the resulting error may be much less for the phase data.

It may be an advantage to calculate the second time difference measurement as the sum of the first time difference measurement and the change in the phase measurement (properly scaled) from the first to the second measurement epoch. It is also possible to use the phase data to calculate an improved first epoch time difference measurement.

According to a further feature of the present invention therefore, the system may measure both the phase difference and the time delay between the arrival of the signals at each of the said receivers, which phase measurements are used in addition to the time measurements in order to make improved estimates of the time delays, in order to determine the position of the second receiver.

The invention also includes a handset having a reference clock;

means for generating a reference signal locked to the reference clock, the reference signal having a similar format to the transmission signals and thus a portion identical to the portion of the received signal which has predetermined values or which is repeated;

means for comparing, for example by cross-correlating, the received transmission signal and the reference signal to determine their relative time offset;

means for transmitting data representing said relative time offset to enable thereby the position of the handset to be determined.

In practice, as mentioned above, an error may be incurred because of multipath propagation, by not having an accurate knowledge of the paths by which the signals reach the receivers. Multipath propagation spreads out the cross-correlation, making it harder to estimate the position of the peak. It may also result in a multi-peaked cross-correlation with the desired peak having a lower amplitude than others. If all the signals arrive by indirect routes, there may be no peak at all corresponding to the line-of-sight propagation path. It should be noted, however, that multipath propagation always results in a delay of the signals compared to the direct path. Provided that the base station antenna is in the clear above the surrounding clutter so that it receives the most direct signals only, then delayed signals at the rover always appear to the later side of the peak of the cross-correlation.

Although the effects of multipath propagation may be relatively small in many circumstances and may be overcome by the multiple template technique mentioned above, it would often be desirable to reduce its effects in a simple manner.

We have appreciated that the effects of multipath propagation can be minimised by identifying and measuring the time of arrival of a signal received from a transmission source, relative to the reference signal locked to the reference clock, in time or equivalent transformed space, by auto-correlating a measured part of said received signal;

constructing a template comprising a portion of the auto-correlation of an expected part of said received signal and a portion of the auto-correlation of a part of the measured part of said received signal;

cross-correlating the expected part of said received signal with the measured part of said received signal; and measuring the offset at which the template best fits the cross-correlation as the time of arrival of the signal broadcast by a transmission source relative to said reference signal.

The invention therefore also includes a mobile receiver, e.g. a telephone handset, comprising means for carrying out the above method.

It is possible to carry out this process, equivalently, for example, in the Fourier transform domain, in which case the auto-correlation function becomes the power spectrum and the cross-correlation function becomes the cross-power spectrum.

The signal parts which are readily identifiable and known in advance, in the case of a GSM system may be, for example, the extended training sequence. In the case of a CDMA system the parts of the signal may be pilot spreading codes.

The means for constructing the template may comprise means for combining a portion of the auto-correlation of an expected part of said received signal corresponding to offset times before that of the central peak of said received signal with a portion of the auto-correlation of a part of the measured part of said received signal corresponding to offset times after that of the central peak.

One example of a particular implementation of a system according to the present invention will now be described with reference to the accompanying drawings, in which:

FIG. 3 illustrates portions of a GSM signal and a template generated by a handset for correlation purposes;

Figure 1:
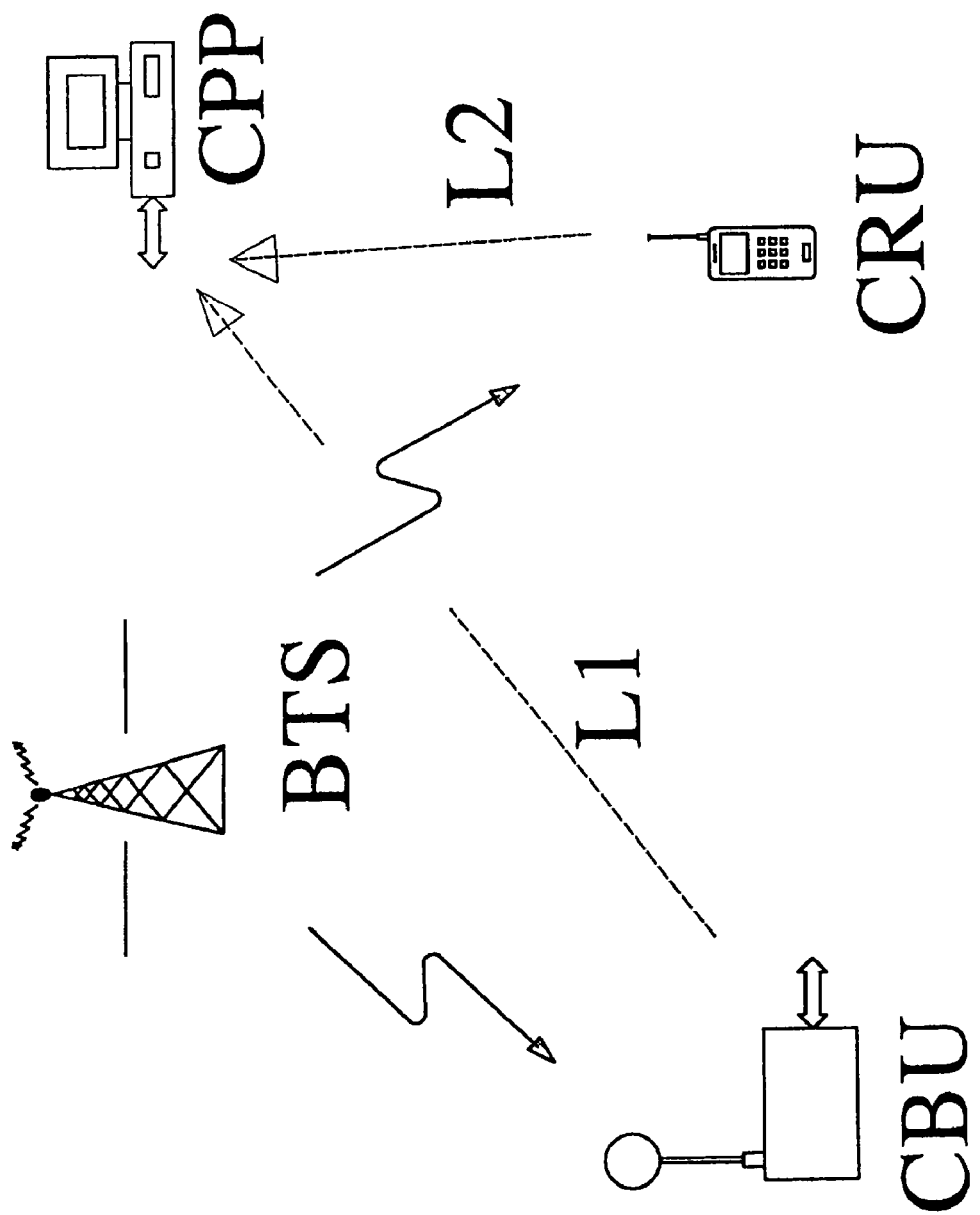
FIG. 1 is a diagram of a CURSOR network.
Figure 2:
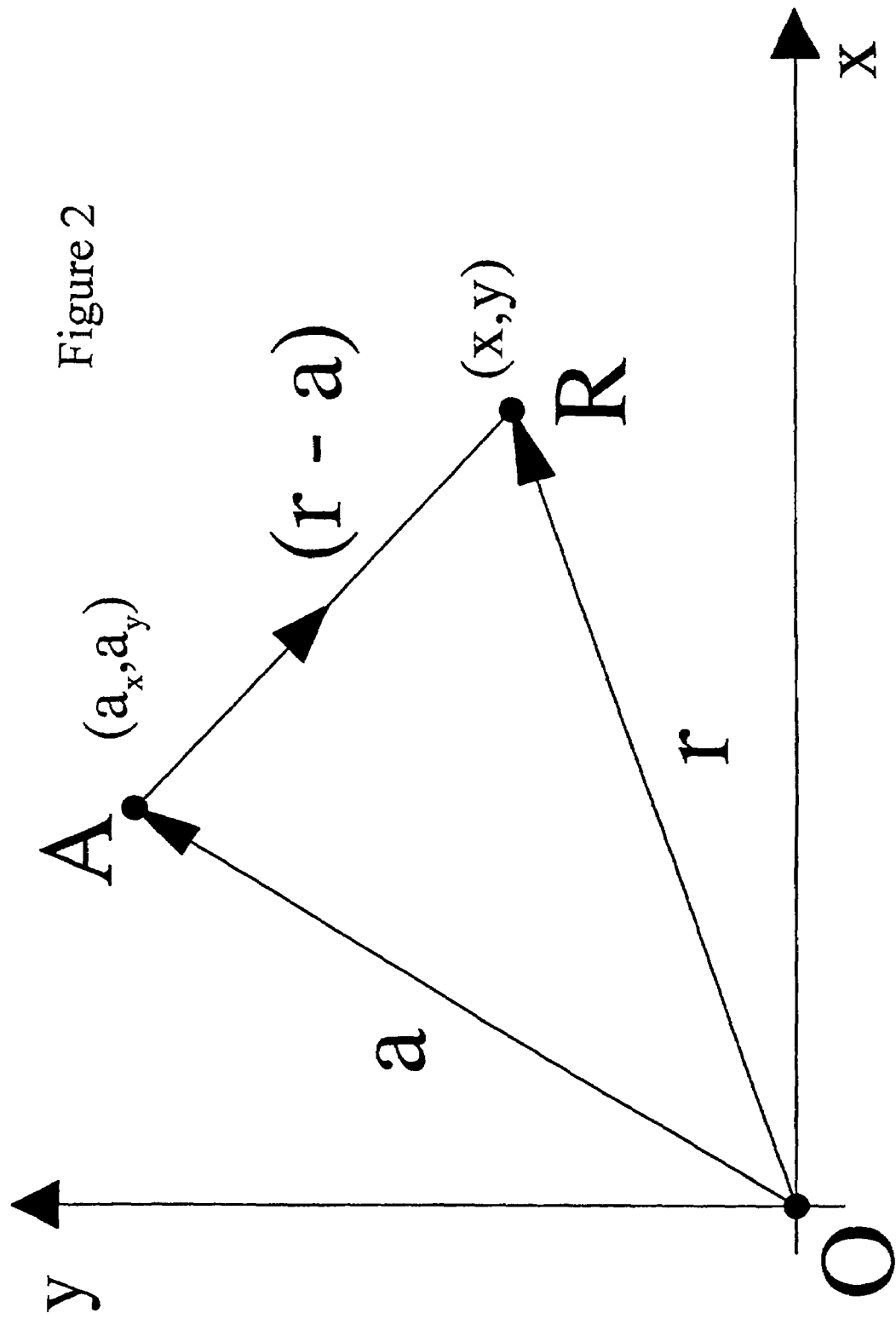
FIG. 2 illustrates the geometry of a CURSOR network.
Figure 4:
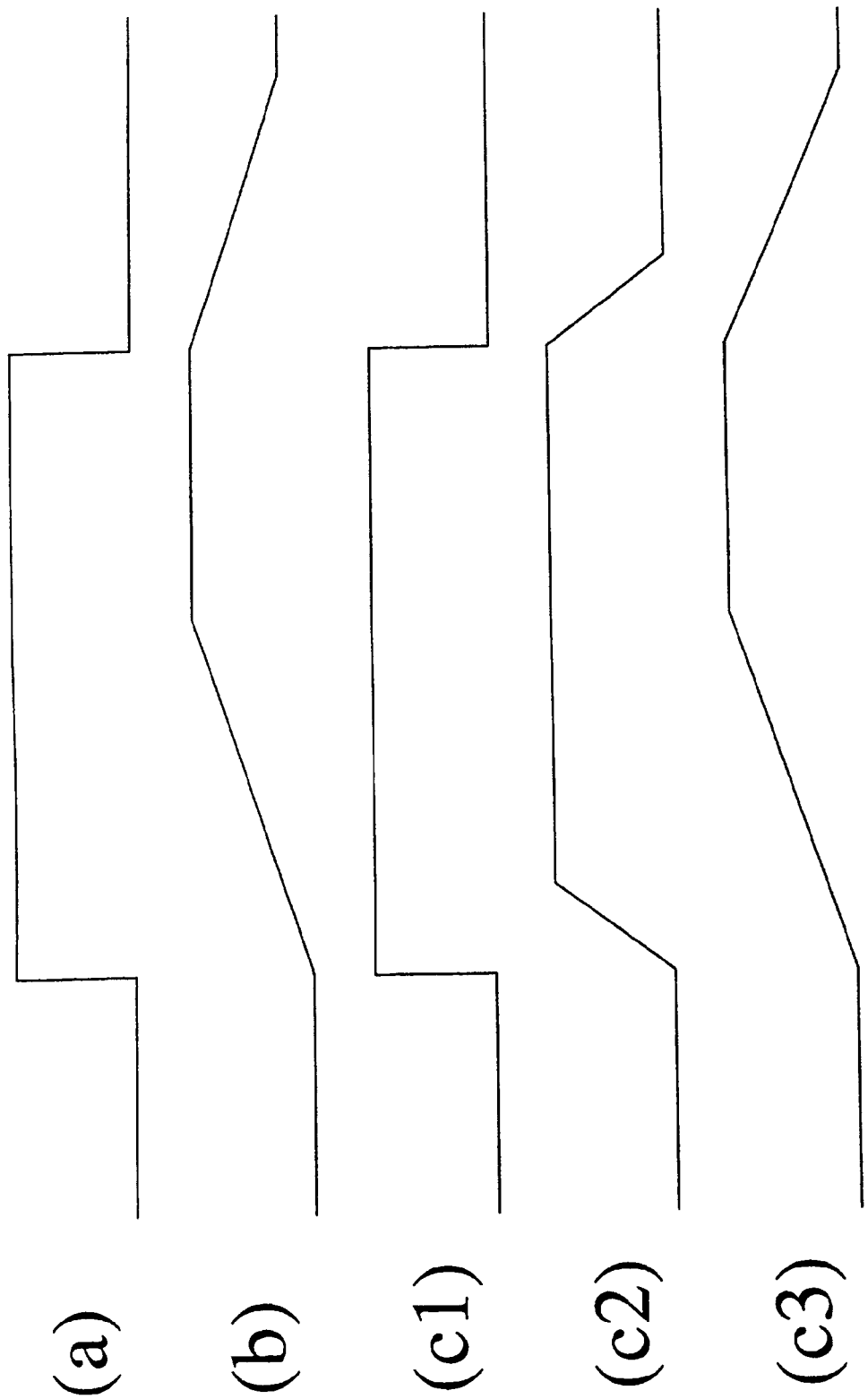
Figure 5:
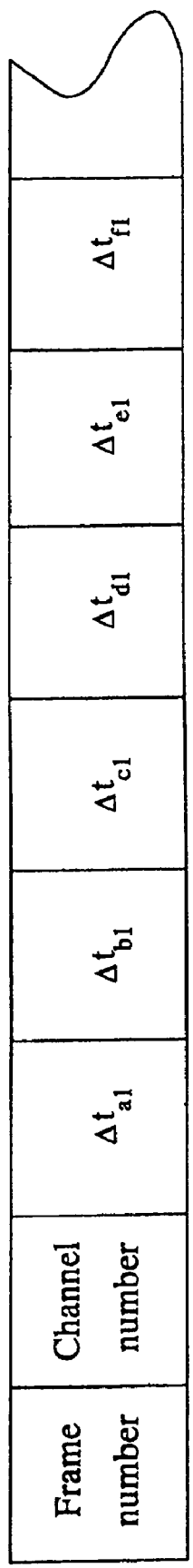
Figure 6:
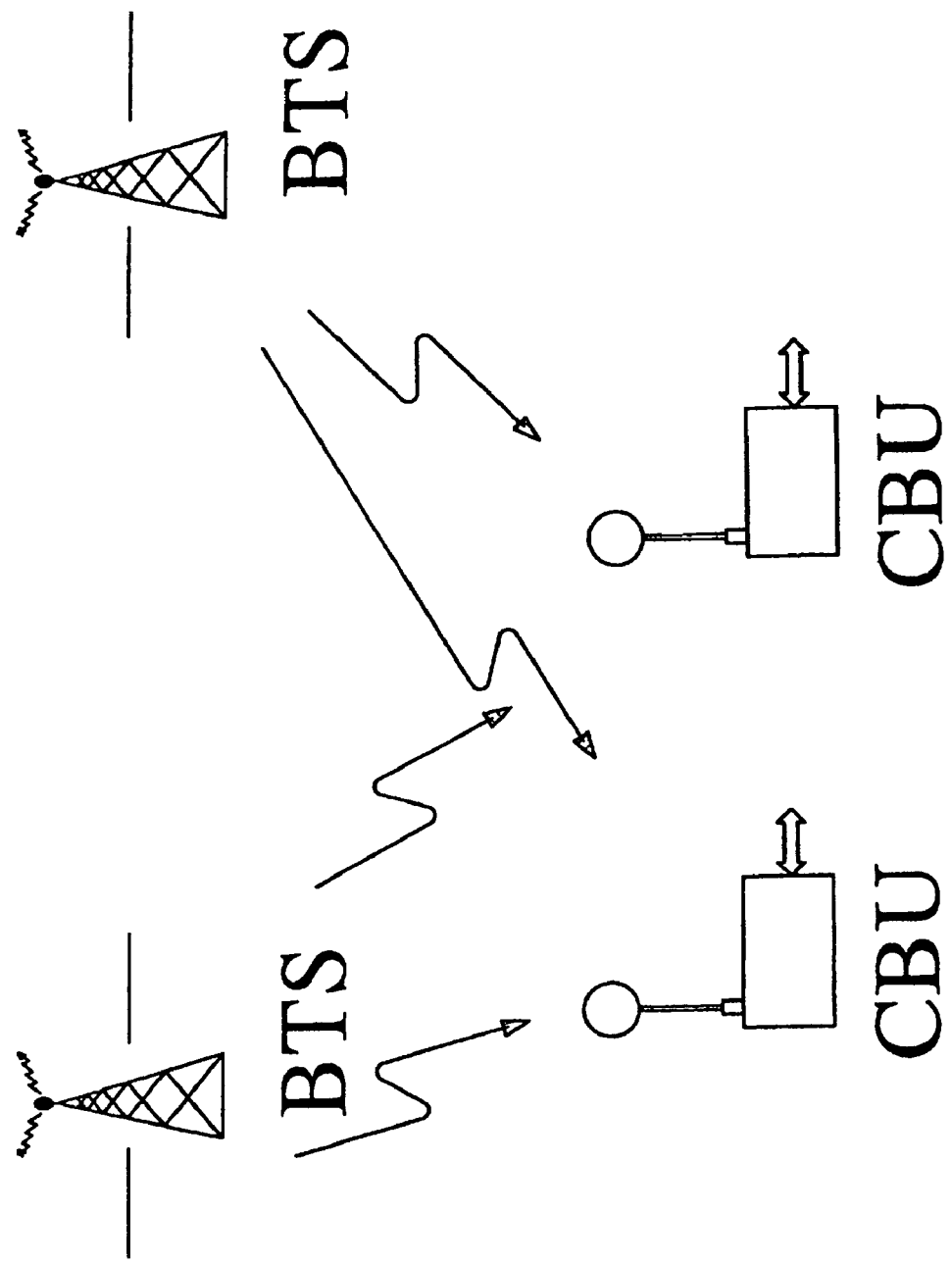
Figure 7:
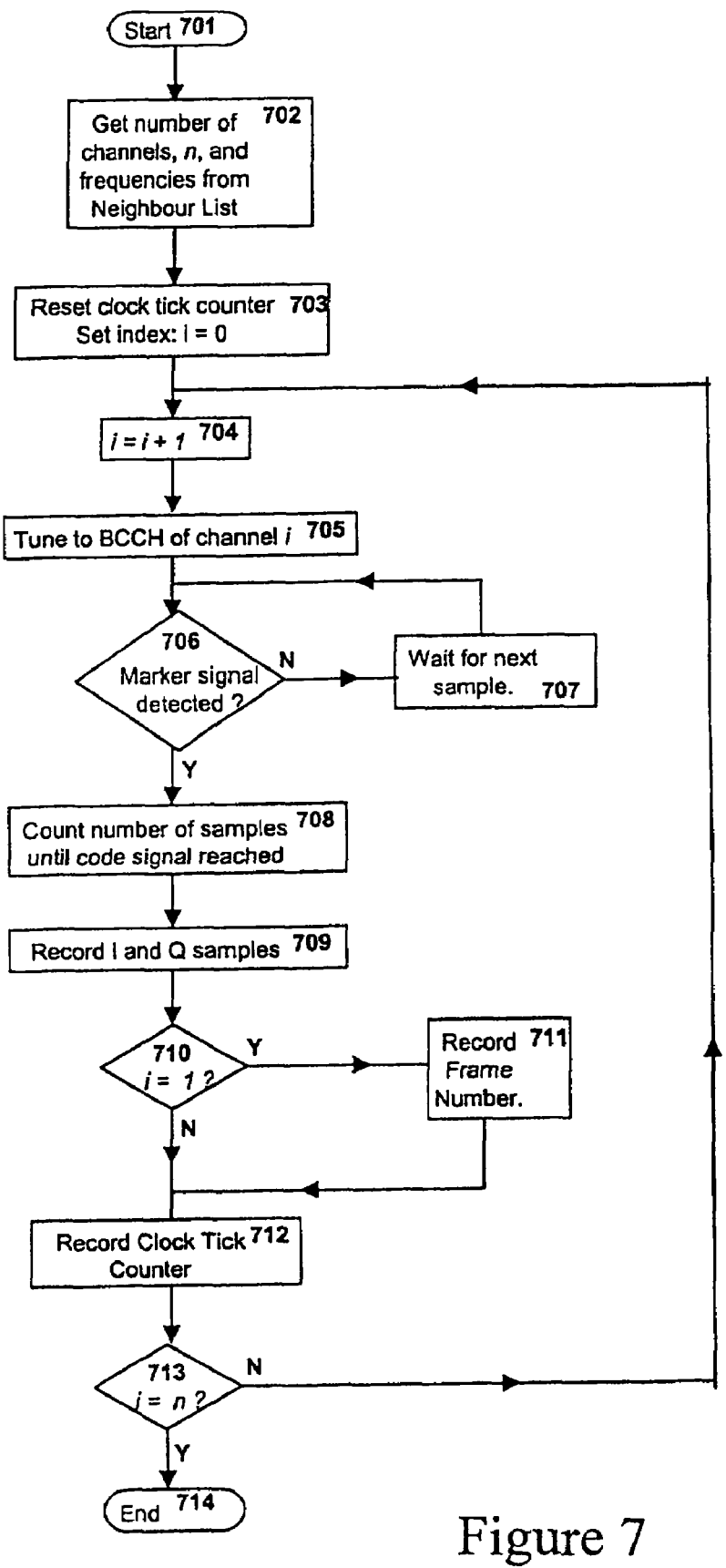
Figure 9:
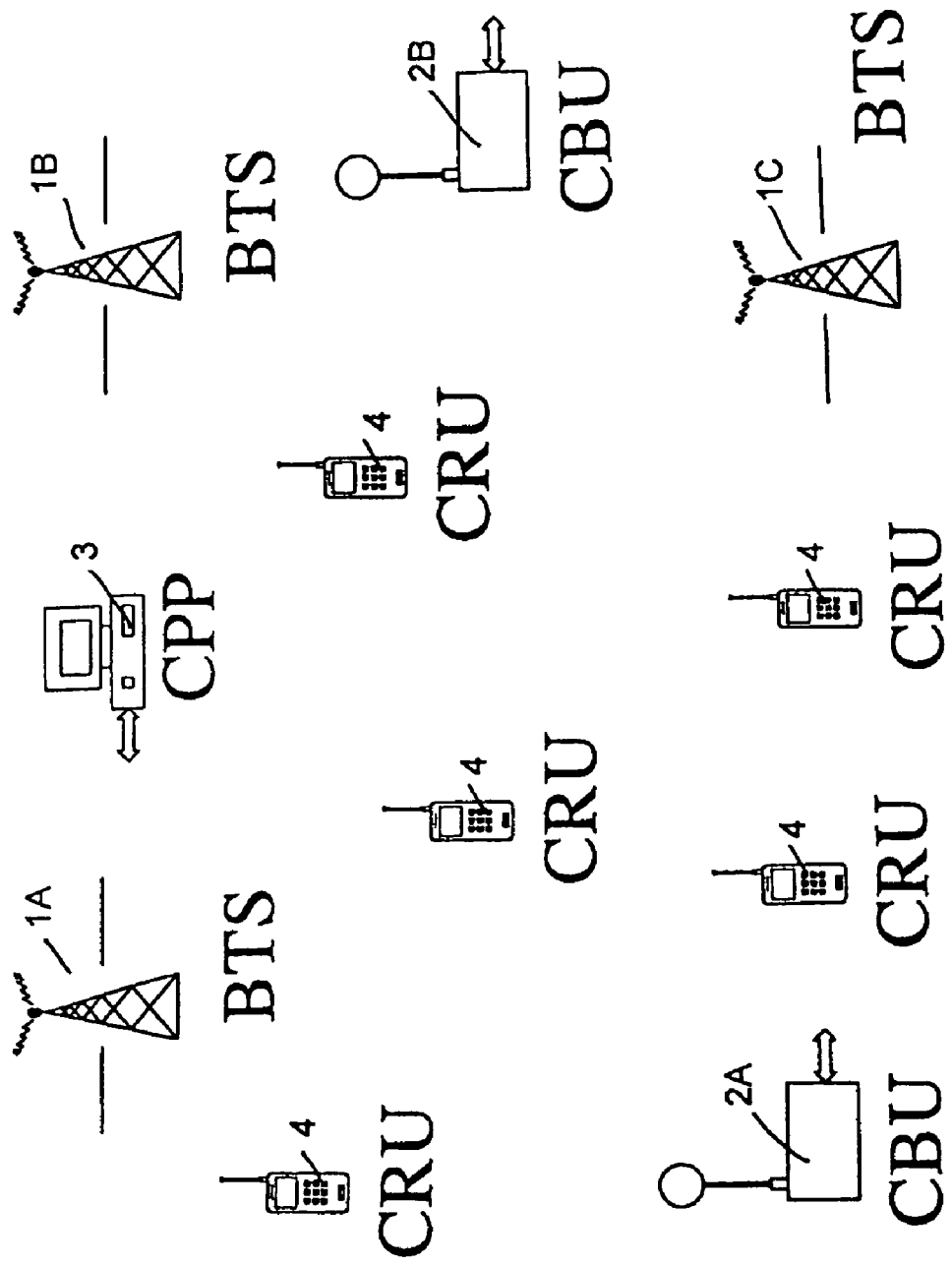
Figure 10:
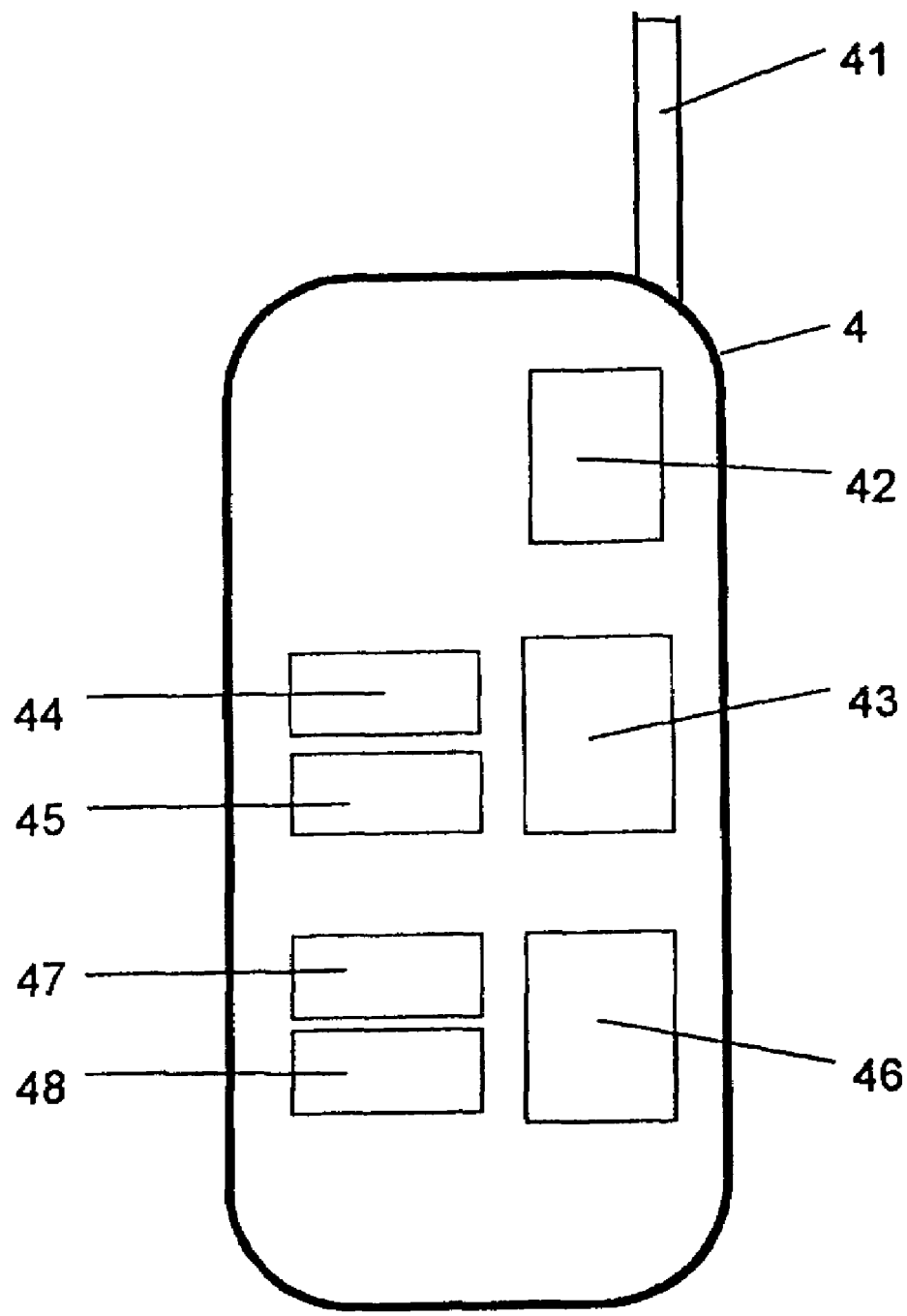

FIGS. 4a-c3 are a set of idealised signal profiles for illustrating the use of multiple templates for reducing the effects of multipath propagation;

FIG. 5 illustrates an SMS packet transmitted by a handset;

FIG. 6 illustrates part of a network of CBUs utilised in a system according to the invention;

FIG. 7 is a flowchart of part of the measurement procedure carried out in the example;

FIGS. 8A to 8D illustrate estimated and measured auto- and cross-correlation functions of signals in the system which may be used to reduce the effects of multipath propagation;

FIG. 9 illustrates the component elements of an exemplary GSM network positioning system; and, FIG. 10 illustrates, diagrammatically, a mobile handset for use with the system and method of the invention.

By way of example, a particular implementation of a system according to the present invention applied to a GSM digital mobile telephone system, will now be described. As described hereinabove, and as illustrated in FIG. 9, a GSM CURSOR system comprises the following elements; (a) a network of BTSs units 1A, 1B, 1C etc. transmitting signals, in particular, BCCH signals; (b) a network of CBUs 2A, 2B, etc. set up within the region served by the BTS network receiving the BCCH signals and fixed at known locations; (c) a CPP unit 3 by which the positions of the mobile handsets are calculated; and (d) plural CURSOR-enabled handsets 4, the CRUs, whose positions are to be determined.

A CURSOR-enabled handset (CRU) 4 does most of its work during idle time (at the cost of slightly increased battery drain). Thus the CURSOR measurements have already been made by the time the user makes a call in the usual way.

FIG. 10 is a simplified diagram of a handset comprising a conventional digital cellular radio handset adapted to operate in accordance with the invention. The handset 4 includes an antenna 41 which provides a signal to a receiver 42, from which the received signal is passed to a digital signal processor (DSP) 43. The digital signal processor 43 has an associated RAM 44 and a ROM 45 or similar for containing software used by the DSP 43. A conventional microprocessor or central controller (CPU) 46 receives signals processed by the DSP and also has associated RAM 47 and ROM or similar 48 for containing operating software. The other normal components of a cellular telephone handset, eg battery, keypad, LCD screen etc. are not shown as they are not germane to the present invention. In use in accordance with the invention, the DSP 43 and associated RAM 44, operating under the control of a modified program stored in ROM 45 operate to carry out the required signal measurements and the microprocessor 46 and associated RAM 47 operate to measure the timing offsets under the control of a modified program stored in the ROM 48.

GSM CURSOR measurements are made on the In-phase (I) and Quadrature-phase (Q) raw data samples from the analogue to digital converter. About 140 I and Q samples are recorded in the handset at a sampling rate of about 541,000 samples per second. This data is extracted before any DSP processing, such as channel equalisation, because the time-delay inserted by the processing is not known accurately.

The I and Q samples are treated as follows in the DSP 43. For the detection of a marker signal (see definition below), such as a frequency-correction burst, the I and Q outputs are first combined to give a standard FM-demodulator output, consisting of the difference between successive values of $\tan^{-1}(Q/I)$, calculated in the full range 0 to 360 degrees. A frequency-correction burst (FCB) then appears as a set of consecutive 'zero' or 'one' samples; and may be recognised as such. The cross-correlation between the expected and recorded code signal (see definition below) may be performed either on this same demodulated series, or using the I and Q values themselves as the real and imaginary components in a complex cross-correlation operation.

At least three such recordings must be made on geometrically-diverse Broadcast Control Channel (BCCH) carriers, although five or six are made in practice. The low-level data memory requirement for this is about 140×2=280 bytes per channel. It is normal for a handset to maintain a neighbour list of up to six surrounding BCCHs. This is the list that is used for CURSOR operation. The frame numbers of the BCCH on the serving cell are decoded and used as time-stamps for each CURSOR measurement set. The complete set of recordings made on, say, 6 channels are made synchronously with the internal crystal-controlled oscillator. All recorded data are copied to controller ram for secondary processing.

In the case of a handset, CRU 4, the GSM CURSOR measurement procedure is carried out, in the DSP 43 (see FIG. 10) at regular intervals of between 10 and 60 seconds during the handset's idle time and is described below with reference to FIG. 7. Each procedure takes less than 1 second. Two repetitive characteristics of a BCCH transmission are readily identified. The first of these we call a marker signal and the second we call a code signal, which arrives at a known time after the marker. The marker signal could, for example, be a frequency-correction burst (FCB), and the code signal could be a synchronisation burst (SCH). There are many other possibilities. The handset waits for the arrival of a marker signal, and records the code signal (see FIG. 7). The process begins at step 701 and the list of n channels and their frequencies are retrieved from the handset's neighbour list 702. A counter locked to the handset's reference oscillator is reset in step 703 and an index i is set to zero. In the main processing loop 704-713, the index is first incremented, at step 704 and the handset tunes, at step 705, to the first BCCH in the list, and waits for the arrival of the next marker signal in step 706. When the clock tick count has reached the number corresponding to the arrival of the code signal, in step 708, the recording of about 2×140 bytes is then made in step 709, and the frame number is noted in step 711. The clock tick counter is then recorded in step 712 and, depending on the channel number being less than n (step 713), the process returns to step 704 and the handset then retunes to the next BCCH in the list, and awaits the arrival of the next marker signal on this channel. When the marker signal is detected, the value of the clock tick counter is recorded and, after the appropriate wait for the code signal, another 2×140 bytes are recorded. This process is repeated for all the channels in the list by cycling around the loop in the process until, in step 713, it is determined that the recordings have been made for all n channels. The recorded data is transferred to the CPU controller 46 for storing in RAM 48.

The handset CPU controller, microprocessor 46, then performs some integer-based analysis of the data, storing the results in a cyclic buffer in RAM 48 in which the oldest values are replaced by the most recent ones. This analysis involves cross-correlating each of the recordings with a template based on the expected code signal (as mentioned above, the synchronisation burst SCH). The values around the peak of the cross-correlation are identified, and stored in RAM 48 in compressed form as described below. When the user initiates a call that requires the CURSOR functionality to be used, the values resident in the cyclic results buffer, which include the corresponding clock tick values are packed into one SMS package, which is then sent to the CPP where the handset's location is determined.

The data that is to be sent to the CPP may consist of:
the full BTS identification for the serving cell,
the dialled number corresponding to the service for which location was requested,
the frame number of the synchronisation burst recorded from the serving cell,
the clock tick counter values for each of the channels,
the data representations,
the measured BTS short IDs.

The CBU operates in much the same way as the CRU. The main differences are that (a) the CBU monitors a much larger set of surrounding BCCH transmissions (typically 15-20), (b) the measurements are taken more frequently, say every 5 seconds, (c) the data is sent back to the CPP using any appropriate means e.g. an ISDN connection, (d) in some modes of operation, the CBU places a call to the CPP when it detects that a sufficiently-large time drift has occurred, and (e) the CBU can operate in network-monitoring and synchronisation modes as described above.

The CPP typically functions in a CRU-activated mode. An incoming CURSOR SMS packet stimulates interrogation of the appropriate CBU or CBUs to extract the recorded data corresponding to the times of the CRU measurements. The CPP then uses standard procedures as described in our previous patent specifications mentioned above to calculate the position of the CRU using equations 7 above. The CPP may first consult an internal database of recent CBU measurements to determine if it has already obtained the required CBU information before requesting new data from any CBU.

The process of compression referred to above is as follows for each of a number of cross-correlation vectors:

the values that are identified are the peak value c of the cross-correlation and the two values immediately adjacent and on each side of the peak value, respectively b, a and d, e, thus being in order a, b, c, d, e;

the value of a is subtracted from the other values to give values of 0, b-a, c-a, d-a, & e-a;

the largest of these values is c-a and this is scaled to have the value of the 33-bit number consisting of a '1' followed by 32 '0's, by multiplication by a factor x;

the same scaling factor x is used to multiply b-a, d-a & e-a so that they are scaled equivalently;

the lower twenty-four bits of these values are then removed to leave 8-bit representations in each case;

as the first and third of the original values now comprise, respectively, 0 & 256 which are known, only the second, fourth and fifth numbers need to be sent to the CPP, and as each of the three resulting numbers can be represented in an 8-bit representation (i.e. a value between 0 & 255), the first two being positive 8-bit integers and the third a signed, 8-bit integer and each thus a single byte, the shape of the entire correlation curve can be represented by just three bytes of data in the SMS message.

An example of a method of minimising the effects of multipath propagation is described below in connection with the accompanying FIGS. 8A to 8D which illustrate estimated and measured auto- and cross-correlation functions of signals in the system, as described below.

Figure 8A:
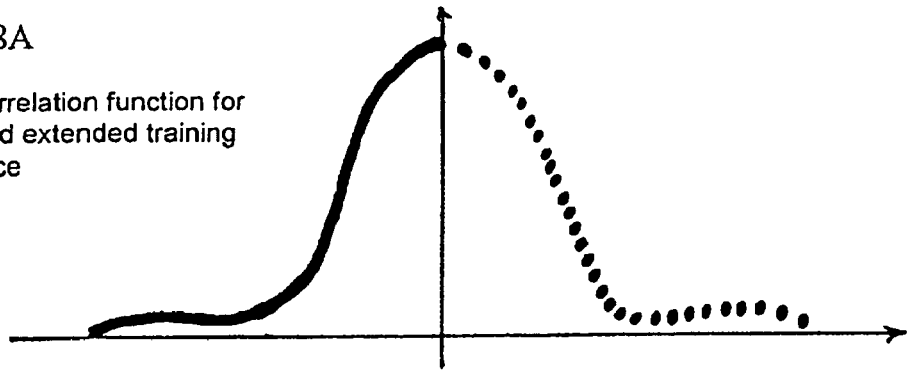
Figure 8B:
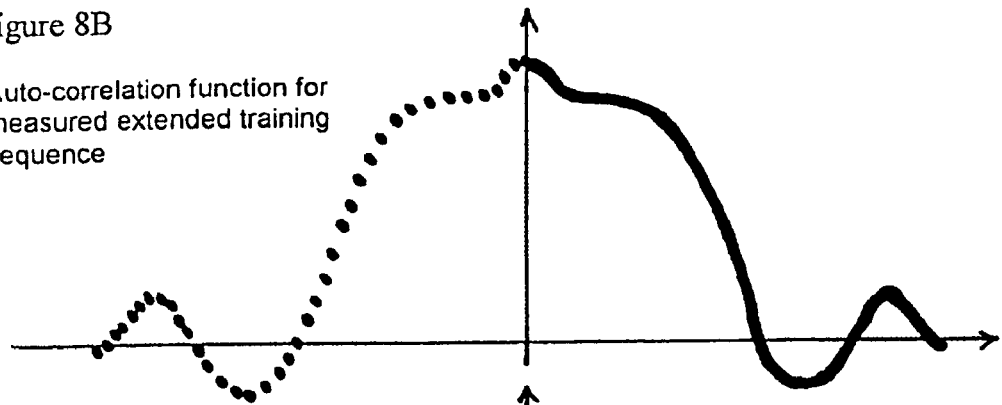
Figure 8C:
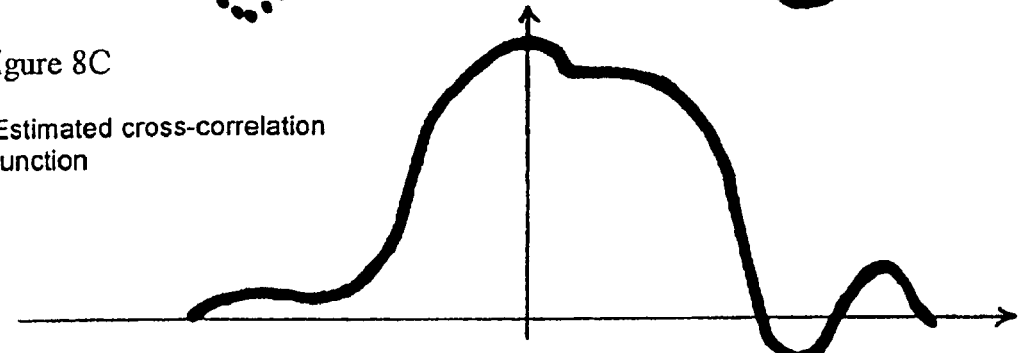
Figure 8D:
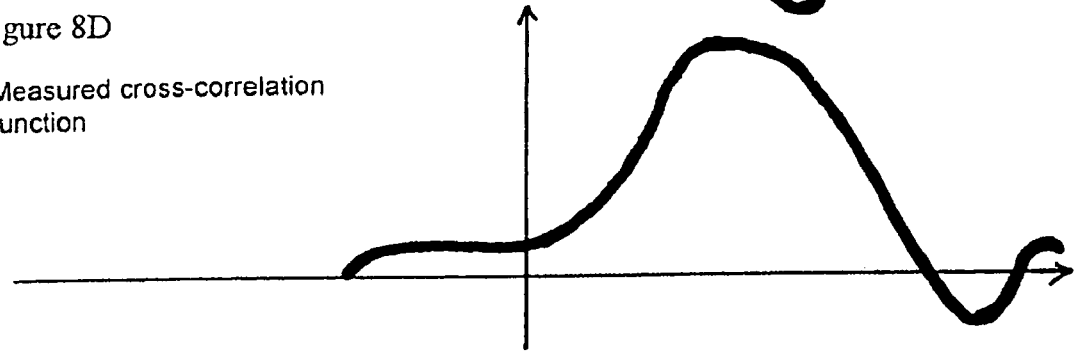

As mentioned above, measuring the time of arrival of the earliest to arrive of the copies of such a multipath composite signal relative to an internal reference signal of the mobile receiver enables this error to be minimized. This example of the present invention makes use of readily identifiable signal structures designed to have good auto-correlation properties, e.g. the extended training sequences in a GSM digital cellular network, and is illustrated in FIGS. 8A to 8D. The auto-correlation function of the extended training sequence in a GSM signal (illustrated in FIG. 8A) is well known. The left hand side of this (corresponding to the negative time axis) is used as the left hand side of an estimated cross-correlation function (illustrated in FIG. 8C) of the received signals and the expected extended training sequence. The right hand side of the auto-correlation function of the measured extended training sequence (illustrated in FIG. 8B and corresponding to the positive time axis) is used as the right hand side of the estimated cross-correlation function (FIG. 8C). The received signals are cross-correlated with the expected extended training sequence and the resulting measured cross-correlation function (illustrated in FIG. 8D) compared with the estimated cross-correlation function (FIG. 8C) to find the timing offset.

The invention claimed is:

1. A positioning system comprising at least two receivers of a digital telephone network having a plurality of transmission sources, the first of which receivers is at a known location and the second of which is a mobile receiver whose position is to be determined, said system utilising transmission signals having a format at least a portion of which has predetermined values or a portion which is repeated, each receiver including
a reference clock;
means for generating in each receiver a reference signal locked to the reference clock, the reference signal having a similar format to the transmission signals and thus a portion identical to the portion of the received signal which has predetermined values or which is repeated; and
means, in each receiver, for comparing the received transmission signal and the reference signal to determine their relative time offset to enable thereby the position of the second receiver so be determined by determining the time delay between the respective signals received at both receivers.

2. A positioning system according to claim 1, wherein said reference signal is generated from the known characteristics of said transmission signals.

3. A positioning system according to claim 1, wherein said reference signal is generated from a first received transmission.

4. A positioning system according to claim 1, further including a central processor, said central processor receiving from the receivers data representing the relative time offsets of the transmission signals received at each receiver from the transmission sources, and for determining the position of the second receiver by determining the time delay between the respective signals received at both receivers from said relative time offsets.

5. A positioning system according to claim 4, wherein said central processor receives said data from the receivers via one or more packets of a data service in a GSM network.

6. A positioning system according to claim 4, wherein data representing the position of said mobile receiver is transmitted from said central processor.

7. A positioning system according to claim 6, wherein data representing the position of said mobile receiver is transmitted from said central processor to said mobile receiver.

8. A positioning system according to claim 1, wherein the transmission signals are control channel signals.

9. A positioning system according to claim 8, wherein the transmission signals comprise BCCH signals of a GSM network.

10. A positioning system according to claim 1, wherein the transmission signals comprise numbered TDMA frames repeated at predetermined intervals and wherein said receivers are arranged to make recordings of the transmission signals from said transmission sources relative to the time of arrival of a given numbered frame, thereby to synchronise the start of said recordings.

11. A positioning system according to claim 1, adapted to determine the time delay between the respective signals received at both receivers at such time when said mobile receiver is not otherwise engaged.

12. A positioning system according to claim 1, wherein the receivers are multi-channel receivers.

13. A positioning system according to claim 1, wherein measurements of both the phase difference and the time delay between the arrival of the signals at each of the said receivers are determined, which phase measurements are used in addition to the time measurements in order to make improved estimates of the time delays, in order to determine the position of the second receiver.

14. A positioning system according to claim 1, including means for minimising the effects of multipath propagation by identifying and measuring the time of arrival of a signal received from a transmission source, relative to a reference signal locked to an internal reference clock, in time or equivalent transformed space, said means
auto-correlating a measured part of said received signal;
constructing a template comprising a portion of the auto-correlation of an expected part of said received signal and a portion of the auto-correlation of a part of the measured part of said received signal;
cross-correlating the expected part of said received signal with the measured part of said received signal; and
measuring the offset at which the template best fits the cross-correlation as the time of arrival of the signal broadcast by a transmission source relative to said reference signal.

15. A positioning system according to claim 14, wherein the means for constructing the template comprises means for combining a portion of the auto-correlation of an expected part of said received signal corresponding to offset times before that of the central peak of said received signal with a portion of the auto-correlation of a part of the measured part of said received signal corresponding to offset times after that of the central peak.

16. A digital telephone network incorporating a positioning system according to claim 1.

17. A digital telephone network according to claim 16, further including plural fixed receivers at known locations; and means for synchronising said network by establishing the time offsets measured by said plural fixed receivers.

18. A digital telephone network according to claim 16, further including plural fixed receivers at known locations, each of said receivers having an internal clock; and means for synchronising said fixed receivers by establishing the time offsets of their respective internal clocks.

19. A digital telephone network according to claim 18, further including means for synchronising said network by establishing transmission time offsets of said transmission sources from said fixed receivers.

20. A digital telephone network according to claim 18, further including means for establishing the position of a transmission source from said fixed receivers.

21. A handset for a digital telephone network incorporating a positioning system according to claim 1, said handset including
a reference clock;
means for generating a reference signal locked to the reference clock, the reference signal having a similar format to the transmission signals and thus a portion identical to the portion of the received signal which has predetermined values or which is repeated;

means for comparing the received transmission signal and the reference signal to determine their relative time offset;

means for transmitting data representing said relative time offset to enable thereby the position of the handset to be determined.

22. A positioning system comprising at least two receivers of a digital telephone network having a plurality of transmission sources, the first of which receivers is at a known location and the second of which is a mobile receiver whose position is to be determined, said system utilising transmission signals having a format at least a portion of which has predetermined values, and the relative time offsets of the transmission signals received at each receiver from said transmission sources being measured relative to each other in said receivers by means for comparing the received transmission signals from the different transmission sources with one another to determine their relative time offsets and thereby determine the position of the second receiver by determining the time delay between the respective signals received at both receivers.

23. A positioning system according to claim 22, further including a central processor, said central processor receiving from the receivers data representing the relative time offsets of the transmission signals received at each receiver from the transmission sources, and for determining the position of the second receiver by determining the time delay between the respective signals received at both receivers from said relative time offsets.

24. A positioning system according to claim 23, wherein said central processor receives said data from the receivers via one or more packets of a data service in a GSM network.

25. A positioning system according to claim 23, wherein data representing the position of said mobile receiver is transmitted from said central processor.

26. A positioning system according to claim 25, wherein data representing the position of said mobile receiver is transmitted from said central processor to said mobile receiver.

27. A positioning system according to claim 22, wherein the transmission signals are control channel signals.

28. A positioning system according to claim 27, wherein the transmission signals comprise BCCH signals of a GSM network.

29. A positioning system according to claim 22, wherein the transmission signals comprise numbered TDMA frames repeated at predetermined intervals and wherein said receivers are arranged to make recordings of the transmission signals from said transmission sources relative to the time of arrival of a given numbered frame, thereby to synchronise the start of said recordings.

30. A positioning system according to claim 22, adapted to determine the time delay between the respective signals received at both receivers at such time when said mobile receiver is not otherwise engaged.

31. A positioning system according to claim 22, wherein the receivers are multi-channel receivers.

32. A positioning system according to claim 22, wherein measurements of both the phase difference and the time delay between the arrival of the signals at each of the said receivers are determined, which phase measurements are used in addition to the time measurements in order to make improved estimates of the time delays, in order to determine the position of the second receiver.

33. A positioning system according to claim 22, including means for minimising the effects of multipath propagation by identifying and measuring the time of arrival of a signal received from a transmission source, relative to a reference signal locked to an internal reference clock, in time or equivalent transformed space, said means auto-correlating a measured part of said received signal;

constructing a template comprising a portion of the auto-correlation of an expected part of said received signal and a portion of the auto-correlation of a part of the measured part of said received signal;

cross-correlating the expected part of said received signal with the measured part of said received signal; and measuring the offset at which the template best fits the cross-correlation as the time of arrival of the signal broadcast by a transmission source relative to said reference signal.

34. A positioning system according to claim 33, wherein the means for constructing the template comprises means for combining a portion of the auto-correlation of an expected part of said received signal corresponding to offset times before that of the central peak of said received signal with a portion of the auto-correlation of a part of the measured part of said received signal corresponding to offset times after that of the central peak.

35. A digital telephone network incorporating a positioning system according to claim 22.

36. A digital telephone network according to claim 35, further including plural fixed receivers at known locations; and means for synchronising said network by establishing the time offsets measured by said plural fixed receivers.

37. A digital telephone network according to claim 35, further including plural fixed receivers at known locations, each of said receivers having an internal clock; and means for synchronising said fixed receivers by establishing the time offsets of their respective internal clocks.

38. A digital telephone network according to claim 37, further including means for synchronising said network by establishing transmission time offsets of said transmission sources from said fixed receivers.

39. A digital telephone network according to claim 37, further including means for establishing the position of a transmission source from said fixed receivers.

40. A handset for a digital telephone network incorporating a positioning system according to claim 22, said handset including means for measuring the relative time offsets of the transmission signals received at the handset from a number of transmission sources by comparing the received transmission signals from the different transmission sources with one another; and means for transmitting data representing said relative time offsets, for determination of the position of the handset.

41. A positioning system comprising at least two receivers of a digital telephone network having a plurality of transmission sources, the first of which receivers is at a known location and the second of which is a mobile receiver whose position is to be determined, said system utilising transmission signals having a format at least a portion of which is sequentially repeated, in which the relative time offsets of the transmission signals received at each receiver from said transmission sources are measured relative to each other in said receivers by means for comparing the sequentially received transmission signals from the different transmission sources with one another to determine their relative time offsets and thereby determine the position of the second receiver by determining the time delay between the respective signals received at both receivers.

42. A positioning system according to claim 41, further including a central processor, said central processor receiving from the receivers data representing the relative time offsets of the transmission signals received at each receiver from the transmission sources, and for determining the position of the second receiver by determining the time delay between the respective signals received at both receivers from said relative time offsets.

43. A positioning system according to claim 42, wherein said central processor receives said data from the receivers via one or more packets of a data service in a GSM network.

44. A positioning system according to claim 42, wherein data representing the position of said mobile receiver is transmitted from said central processor.

45. A positioning system according to claim 44, wherein data representing the position of said mobile receiver is transmitted from said central processor to said mobile receiver.

46. A positioning system according to claim 41, wherein the transmission signals are control channel signals.

47. A positioning system according to claim 46, wherein the transmission signals comprise BCCH signals of a GSM network.

48. A positioning system according to claim 41, wherein the transmission signals comprise numbered TDMA frames repeated at predetermined intervals and wherein said receivers are arranged to make recordings of the transmission signals from said transmission sources relative to the time of arrival of a given numbered frame, thereby to synchronise the start of said recordings.

49. A positioning system according to claim 41, adapted to determine the time delay between the respective signals received at both receivers at such time when said mobile receiver is not otherwise engaged.

50. A positioning system according to claim 41, wherein the receivers are multi-channel receivers.

51. A positioning system according to claim 41, wherein measurements of both the phase difference and the time delay between the arrival of the signals at each of the said receivers are determined, which phase measurements are used in addition to the time measurements in order to make improved estimates of the time delays, in order to determine the position of the second receiver.

52. A positioning system according to claim 41, including means for minimising the effects of multipath propagation by identifying and measuring the time of arrival of a signal received from a transmission source, relative to a reference signal locked to an internal reference clock, in time or equivalent transformed space, said means
    auto-correlating a measured part of said received signal;
    constructing a template comprising a portion of the auto-correlation of an expected part of said received signal and a portion of the auto-correlation of a part of the measured part of said received signal;
    cross-correlating the expected part of said received signal with the measured part of said received signal; and
    measuring the offset at which the template best fits the cross-correlation as the time of arrival of the signal broadcast by a transmission source relative to said reference signal.

53. A positioning system according to claim 52, wherein the means for constructing the template comprises means for combining a portion of the auto-correlation of an expected part of said received signal corresponding to offset times before that of the central peak of said received signal with a portion of the auto-correlation of a part of the measured part of said received signal corresponding to offset times after that of the central peak.

54. A digital telephone network incorporating a positioning system according to claim 41.

55. A digital telephone network according to claim 54, further including plural fixed receivers at known locations; and means for synchronising said network by establishing the time offsets measured by said plural fixed receivers.

56. A digital telephone network according to claim 54, further including plural fixed receivers at known locations, each of said receivers having an internal clock; and means for synchronising said fixed receivers by establishing the time offsets of their respective internal clocks.

57. A digital telephone network according to claim 56, further including means for synchronising said network by establishing transmission time offsets of said transmission sources from said fixed receivers.

58. A digital telephone network according to claim 56, further including means for establishing the position of a transmission source from said fixed receivers.

59. A handset for a digital telephone network incorporating a positioning system according to claim 41, said handset including means for measuring the relative time offsets of the transmission signals received at the handset from a number of transmission sources by comparing the received transmission signals from the different transmission sources with one another; and means for transmitting data representing said relative time offsets, for determination of the position of the handset.

60. A method of determining the position of a mobile receiver in a digital telephone network positioning system having at least two receivers, the first of which is at a known location and the second of which is mobile, the method comprising
    transmitting signals from a plurality of sources, the transmission signals having a format at least a portion of which has predetermined values or a portion of which is repeated;
    determining the time offset, of the transmission signals received at each receiver from a transmission source relative to a reference clock of each receiver, by generating a reference signal locked to the reference clock, the reference signal having a similar format to the transmission signals and including a portion identical to the predetermined values or repeated portion of the received signal and comparing the received transmission signal and the reference signal; and
    determining the time delay between the respective signals received at both receivers by determining their relative time offset, to thereby determine the position of the second receiver.

61. A method according to claim 60, wherein said reference signal is generated from the known characteristics of said transmission signals.

62. A method according to claim 60, wherein said reference signal is generated from a first received transmission.

63. A method according to 60, wherein data representing the relative time offsets of the transmission signals received at each receiver from the transmission sources is received by a central processor from the receivers, and the position of the second receiver is calculated by determining the time delay between the respective signals received at both receivers from said relative time offsets.

64. A method according to claim 63, wherein said data from the receivers is received at said central processor in one or more packets of a data service in a GSM network.

65. A method according to claim 63, wherein data representing the position of said mobile receiver is transmitted from said central processor.

66. A method according to claim 65, wherein data representing the position of said mobile receiver is transmitted from said central processor to said mobile receiver.

67. A method according to claim 60, wherein the transmission signals are control channel signals.

68. A method according to claim 67, wherein the transmission signals comprise BCCH signals in a GSM network.

69. A method according to claim 60, wherein the transmission signals comprise numbered TDMA frames repeated at predetermined intervals and wherein said receivers make recordings of the transmission signals from said transmission sources relative to the time of arrival of a given numbered fame, thereby to synchronise the start of said recordings.

70. A method according to claim 60, wherein the time delay between the respective signals received at both receivers is determined at such time when said mobile receiver is not transmitting voice data.

71. A method according to claim 60, wherein measurements of both the phase difference and the time delay between the arrival of the signals at each of the said receivers are determined, which phase measurements are used in addition to the time measurements in order to make improved estimates of the time delays, in order to determine the position of the second receiver.

72. A method according to claim 60, wherein the effects of multipath propagation are minimised by identifying and measuring the time of arrival of a signal received from a transmission source, relative to a reference signal locked to an internal reference clock, in time or equivalent transformed space, by
auto-correlating a measured part of said received signal;
constructing a template comprising a portion of the auto-correlation of an expected part of said received signal and a portion of the auto-correlation of a part of the measured part of said received signal;
cross-correlating the expected part of said received signal with the measured part of said received signal; and
measuring the offset at which the template best fits the cross-correlation as the time of arrival of the signal broadcast by a transmission source relative to said reference signal.

73. A method according to claim 72, wherein the template is constructed by combining a portion of the auto-correlation of an expected part of said received signal corresponding to offset times before that of the central peak of said received signal with a portion of the auto-correlation of a part of the measured part of said received signal corresponding to offset times after that of the central peak.

74. A method according to claim 60, wherein values resulting from the comparison are compressed by a method in which:
the largest value and values immediately adjacent and on each side of the largest value are identified;
the lowest value on one side is subtracted from the other values to provide a set of resulting values;
the largest resulting value is scaled by a selected factor to have a known value;
the other resulting values are scaled by the same factor;
the least significant bits in each case are then removed to leave the most significant bits as representations in each case;
the lowest and highest representations are discarded since they are known; and
the remaining representations only are used to represent the results of the comparison.

75. A method of determining the position of a mobile receiver in a digital telephone network positioning system having at least two receivers, the first of which is at a known location and the second of which is mobile, the method comprising
transmitting signals from a plurality of sources, the transmission signals having a format at least a portion of which has predetermined values;
measuring the relative time offsets, of the transmission signals received at each receiver from the plurality of transmission sources, relative to each other by comparing with one another the received transmission signals from the different transmission sources; and
determining the time delay between the respective signals received at both receivers to determine the position of the mobile receiver.

76. A method according to 75, wherein data representing the relative tine offsets of the transmission signals received at each receiver from the transmission sources is received by a central processor from the receivers, and the position of the second receiver is calculated by determining the time delay between the respective signals received at both receivers from said relative time offsets.

77. A method according to claim 76, wherein said data from the receivers is received at said central processor in one or more packets of a data service in a GSM network.

78. A method according to claim 76, wherein data representing the position of said mobile receiver is transmitted from said central processor.

79. A method according to claim 78, wherein data representing the position of said mobile receiver is transmitted from said central processor to said mobile receiver.

80. A method according to claim 75, wherein the transmission signals are control channel signals.

81. A method according to claim 80, wherein the transmission signals comprise BCCH signals in a GSM network.

82. A method according to claim 75, wherein the transmission signals comprise numbered TDMA frames repeated at predetermined intervals and wherein said receivers make recordings of the transmission signals from said transmission sources relative to the time of arrival of a given numbered frame, thereby to synchronise the start of said recordings.

83. A method according to claim 75, wherein the time delay between the respective signals received at both receivers is determined at such time when said mobile receiver is not transmitting voice data.

84. A method according to claim 75, wherein measurements of both the phase difference and the time delay between the arrival of the signals at each of the said receivers are determined, which phase measurements are used in addition to the time measurements in order to make improved estimates of the time delays, in order to determine the position of the second receiver.

85. A method according to claim 75, wherein the effects of multipath propagation are minimised by identifying and measuring the time of arrival of a signal received from a transmission source, relative to a reference signal locked to an internal reference clock, in time or equivalent transformed space, by
auto-correlating a measured part of said received signal;
constructing a template comprising a portion of the auto-correlation of an expected part of said received signal and a portion of the auto-correlation of a part of the measured part of said received signal;
cross-correlating the expected part of said received signal with the measured part of said received signal; and measuring the offset at which the template best fits the cross-correlation as the time of arrival of the signal broadcast by a transmission source relative to said reference signal.

86. A method according to claim 85, wherein the template is constructed by combining a portion of the auto-correlation of an expected part of said received signal corresponding to offset times before that of the central peak of said received signal with a portion of the auto-correlation of a part of the measured part of said received signal corresponding to offset times after that of the central peak.

87. A method according to claim 75, wherein values resulting from the comparison are compressed by a method in which:
- the largest value and values immediately adjacent and on each side of the largest value are identified;
- the lowest value on one side is subtracted from the other values to provide a set of resulting values;
- the largest resulting value is scaled by a selected factor to have a known value;
- the other resulting values are scaled by the same factor;
- the least significant bits in each case are then removed to leave the most significant bits as representations in each case;
- the lowest and highest representations are discarded since they are known; and
- the remaining representations only are used to represent the results of the comparison.

88. A method of determining the position of a mobile receiver in a digital telephone network positioning system having at least two receivers, the first of which is at a known location and the second of which is mobile, the method comprising
- transmitting signals from a plurality of sources, the transmission signals having a format at least a portion of which is repeated sequential;
- measuring the relative time offsets, Of the transmission signals received at each receiver from the plurality of transmission sources, relative to each other by comparing with one another the sequentially received transmission signals from the different transmission sources; and
- determining the time delay between the respective signals received at both receivers to determine the position of the mobile receiver.

89. A method according to 88, wherein data representing the relative time offsets of the transmission signals received at each receiver from the transmission sources is received by a central processor from the receivers, and the position of the second receiver is calculated by determining the time delay between the respective signals received at both receivers from said relative time offsets.

90. A method according to claim 89, wherein said data from the receivers is received at said central processor in one or more packets of a data service in a GSM network.

91. A method according to claim 89, wherein data representing the position of said mobile receiver is transmitted from said central processor.

92. A method according to claim 91, wherein data representing the position of said mobile receiver is transmitted from said central processor to said mobile receiver.

93. A method according to claim 88, wherein the transmission signals are control channel signals.

94. A method according to claim 93, wherein the transmission signals comprise BCCH signals in a GSM network.

95. A method according to claim 88, wherein the transmission signals comprise numbered TDMA frames repeated at predetermined intervals and wherein said receivers make recordings of the transmission signals from said transmission sources relative to the time of arrival of a given numbered frame, thereby to synchronise the start of said recordings.

96. A method according to claim 88, wherein the time delay between the respective signals received at both receivers is determined at such time when said mobile receiver is not transmitting voice data.

97. A method according to claim 88, wherein measurements of both the phase difference and the time delay between the arrival of the signals at each of the said receivers are determined, which phase measurements are used in addition to the time measurements in order to make improved estimates of the time delays, in order to determine the position of the second receiver.

98. A method according to claim 88, wherein the effects of multipath propagation are minimised by identifying and measuring the time of arrival of a signal received from a transmission source, relative to a reference signal locked to an internal reference clock, in time or equivalent transformed space, by
- auto-correlating a measured part of said received signal;
- constructing a template comprising a portion of the auto-correlation of an expected part of said received signal and a portion of the auto-correlation of a part of the measured part of said received signal;
- cross-correlating the expected part of said received signal with the measured part of said received signal; and
- measuring the offset at which the template best fits the cross-correlation as the time of arrival of the signal broadcast by a transmission source relative to said reference signal.

99. A method according to claim 98, wherein the template is constructed by combining a portion of the auto-correlation of an expected part of said received signal corresponding to offset times before that of the central peak of said received signal with a portion of the auto-correlation of a part of the measured part of said received signal corresponding to offset times after that of the central peak.

100. A method according to claim 88, wherein values resulting from the comparison are compressed by a method in which:
- the largest value and values immediately adjacent and on each side of the largest value are identified;
- the lowest value on one side is subtracted from the other values to provide a set of resulting values;
- the largest resulting value is scaled by a selected factor to have a known value;
- the other resulting values are scaled by the same factor;
- the least significant bits in each case are then removed to leave the most significant bits as representations in each case;
- the lowest and highest representations are discarded since they are known; and
- the remaining representations only are used to represent the results of the comparison.

* * * * *